Nov. 23, 1926.
E. LOFFER
1,608,107
CUTTER ATTACHMENT FOR CORN HARVESTERS
Filed March 3, 1926
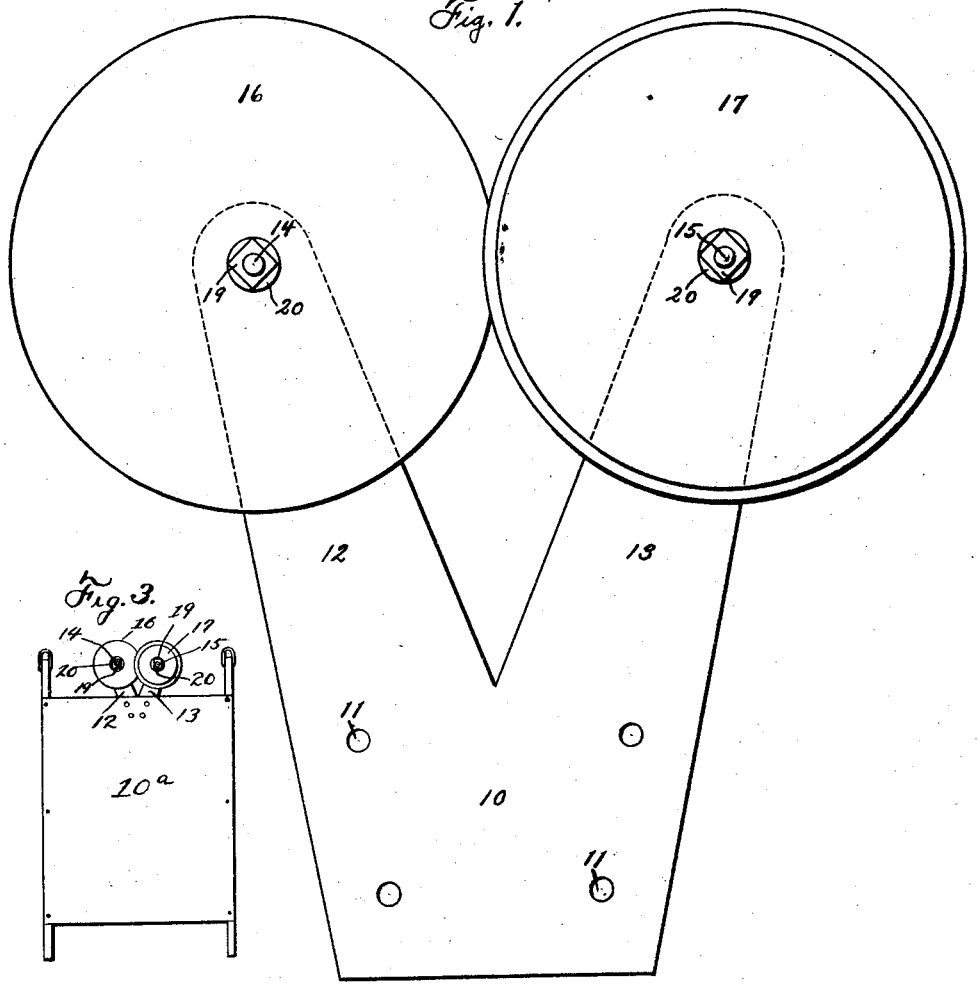
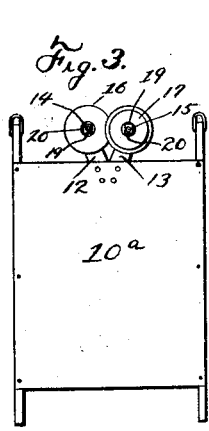
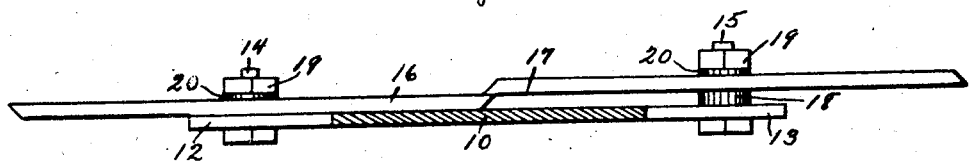
INVENTOR:
ELIAS LOFFER Patented Nov. 23, 1926.

1,608,107

UNITED STATES PATENT OFFICE.

ELIAS LOFFER, OF BEAVER, IOWA

CUTTER ATTACHMENT FOR CORN HARVESTERS.

Application filed March 3, 1926. Serial No. 92,101.

The object of this invention is to provide an improved stalk-cutting attachment for corn harvesters.

A further object of this invention is to provide an improved cutting attachment for corn harvesters, designed to supplant the reciprocatory cutters now in common use and to cut the stalks readily and cleanly and without bending them as when a rigid cutter is employed.

My invention consists in the construction, arrangement and combination of elements hereinafter set forth, pointed out in my claim and illustrated by the accompanying drawing, in which—

Figure 1 is a plan view of my improved cutter ready to be attached to the frame of a harvester. Figure 2 is a rear elevation of the same partly in section. Figure 3 is a plan of a sled on which the stalk-cutting devices are mounted.

In the construction of the device as shown the numeral 10 designates a supporting plate formed with a plurality of holes 11 by which it may be bolted or otherwise suitably secured to a corn harvester frame or sled 10ᵃ in a suitable location. The plate 10 is bifurcated at its forward end portion, forming two divergent arms 12, 13. Pivot bolts 14, 15 are mounted through end portions of the arms 12, 13 respectively and are in a transverse line perpendicular to the longitudinal axis of the plate. Cutting disks 16, 17 are provided and said disks are of relative large diameter and of the same size and are apertured in their centers and rotatively mounted on the bolts 14, 15 respectively. Inner margins of the disks 16, 17 overlap slightly, the disk 17 being spaced from its arm 13 by a washer 18 on the bolt 15, said washer being of substantially the same thickness as the disk 16 so that the disk 17 contacts at its overlapping margin with the disk 16. Nuts 19 are screwed on protruding ends of the bolts 14, 15 to hold the disks in place, and washers 20 preferably are interposed between the nuts and disks. The disks 16, 17 are oppositely beveled, on their relatively outer faces, while their contacting faces are plane.

In use one or more of the devices are attached to the frame of a corn harvester or sled 10ᵃ and the machine is so moved that the longitudinal axis of the bifurcated supporting plate 10 coincides substantially with a row of corn stalks to be cut. The stalks are engaged by the overlapping cutting disks 16, 17 adjacent their inner overlapping margins, and further advance of the machine and disks results in a rotary movement of said disks toward each other and in engagement with the corn stalk, and the stalk is severed on the plane common to the opposed faces of the disks. The action is such that the stalks are not pushed or bent forwardly, as where a rigid cutting member is employed, but the rolling movement of the disks results in a clean cut without noticeably or objectionably disturbing the position of the stalk. The device so constructed is also much simpler and cheaper than the reciprocating sickle bar sometimes employed for this purpose and is more readily sharpened and kept in good working order.

The cutting operation is facilitated by the large diameter of the cutting disks relatively to the thickness or diameter of the objects to be cut, which objects are received between the disks and engaged by both in the cutting operation.

I claim as my invention—

A cutter attachment for corn harvesters, comprising a supporting plate adapted to be secured to a harvester frame, said plate being formed with divergent arms at its forward end, pivot bolts mounted through end portions of said arms, a cutting disk rotatively mounted on one of said bolts, a washer mounted on the other of said bolts, said washer being of substantially the same thickness as said disk, and a cutting disk overlying said washer and rotatively mounted on the last named pivot bolt, each of said disks being beveled on its periphery and being of a diameter exceeding the distance between the outer ends of said arms, said disks adapted to be advanced in a horizontal position and to be rotated involutely by contact with a corn stalk or similar object to sever the same.

ELIAS LOFFER.